(12) United States Patent
Depraete et al.

(10) Patent No.: US 9,752,667 B2
(45) Date of Patent: Sep. 5, 2017

(54) TORQUE CONVERTER AND HYDROKINETIC TORQUE COUPLING DEVICE HAVING TURBINE-PISTON LOCKUP CLUTCH, AND RELATED METHODS

(71) Applicant: VALEO EMBRAYAGES, Amiens (FR)

(72) Inventors: Alexandre Depraete, Bloomfield, MI (US); Zane Yang, Troy, MI (US)

(73) Assignee: Valeo Embrayages (FR)

( * ) Notice: Subject to any disclaimer, the term of this patent is extended or adjusted under 35 U.S.C. 154(b) by 44 days.

(21) Appl. No.: 14/562,136

(22) Filed: Dec. 5, 2014

(65) Prior Publication Data

US 2016/0160975 A1    Jun. 9, 2016

(51) Int. Cl.
  *F16H 45/02*    (2006.01)

(52) U.S. Cl.
  CPC ..... *F16H 45/02* (2013.01); *F16H 2045/0205* (2013.01); *F16H 2045/0231* (2013.01); *F16H 2045/0263* (2013.01); *F16H 2045/0284* (2013.01)

(58) Field of Classification Search
  CPC .............. F16H 45/02; F16H 2045/0205; F16H 2045/0221; F16H 2045/0226; F16H 2045/0231; F16H 2045/0263; F16H 2045/0284
  See application file for complete search history.

(56) References Cited

U.S. PATENT DOCUMENTS

| | | |
|---|---|---|
| 2,130,895 A | 9/1938 | Ness |
| 2,860,747 A | 11/1958 | Kelley |
| 2,992,713 A | 7/1961 | Stump et al. |
| 3,041,892 A | 7/1962 | Schjolin |

(Continued)

FOREIGN PATENT DOCUMENTS

| | | |
|---|---|---|
| DE | 1550957 A1 | 7/1969 |
| DE | 2245901 A1 | 4/1974 |

(Continued)

OTHER PUBLICATIONS

Machine translation of EP 0125428 downloaded from EPO.org on Jul. 22, 2016.*

(Continued)

*Primary Examiner* — Richard Lorence
(74) *Attorney, Agent, or Firm* — Berenato & White, LLC

(57) ABSTRACT

A torque converter is provided that includes an impeller having an impeller shell with a first surface, an axially displaceable turbine-piston hydrodynamically drivable by the impeller and including a turbine-piston shell and a turbine-piston flange with a second surface, and a clutch plate interposed between and axially displaceable relative to at least one of the first and second surfaces. The turbine-piston is axially movable relative to the impeller to move the second surface of the turbine-piston flange towards and away from the first surface for positioning the torque converter into and out of a lockup mode in which the first and second surfaces and the clutch plate surfaces frictionally (Continued)

interlock with one another so that the impeller is mechanically locked to and non-rotatable relative to the turbine-piston.

23 Claims, 10 Drawing Sheets

(56) References Cited

U.S. PATENT DOCUMENTS

| | | | |
|---|---|---|---|
| 3,252,352 | A | 5/1966 | General et al. |
| 4,041,701 | A | 8/1977 | Goto et al. |
| 5,713,442 | A | 2/1998 | Murata et al. |
| 5,813,505 | A | 9/1998 | Olsen et al. |
| 6,026,940 | A | 2/2000 | Sudau |
| 6,915,886 | B2 | 7/2005 | Dacho et al. |
| 7,191,879 | B2 | 3/2007 | Arhab et al. |
| 7,445,099 | B2 | 11/2008 | Maucher et al. |
| 8,276,723 | B2 | 10/2012 | Verhoog et al. |
| 8,479,901 | B2 | 7/2013 | Engelmann |
| 2003/0168298 | A1 | 9/2003 | Holler et al. |
| 2003/0168299 | A1 | 9/2003 | Holler et al. |
| 2003/0217902 | A1 | 11/2003 | Kuwahara |
| 2004/0011032 | A1 | 1/2004 | Holler et al. |
| 2006/0086584 | A1 | 4/2006 | Maucher et al. |
| 2009/0020385 | A1* | 1/2009 | Nakamura ............ F16H 45/02 192/3.29 |
| 2010/0236228 | A1* | 9/2010 | Degler ............... F16F 15/145 60/338 |
| 2012/0080281 | A1 | 4/2012 | Takikawa |
| 2012/0241273 | A1 | 9/2012 | Kawahara |
| 2013/0230385 | A1 | 9/2013 | Lindemann et al. |
| 2014/0014454 | A1 | 1/2014 | Davis |
| 2014/0014455 | A1 | 1/2014 | Davis |
| 2014/0097055 | A1 | 4/2014 | Lindemann et al. |
| 2014/0110207 | A1 | 4/2014 | Davis |
| 2015/0152951 | A1 | 6/2015 | Rentfrow |
| 2015/0362041 | A1 | 12/2015 | Lee et al. |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2706967 A1 | 12/1994 |
| FR | 2736982 A1 | 1/1997 |
| FR | 2787854 A1 | 6/2000 |
| GB | 598811 | 2/1948 |
| JP | 58-131466 A | 8/1983 |
| JP | 2006200607 A | 8/2006 |
| KR | 101311531 B1 | 9/2013 |
| WO | WO2004018897 | 3/2004 |
| WO | 2004046574 A1 | 6/2004 |

OTHER PUBLICATIONS

U.S. Appl. No. 14/510,244, filed Oct. 9, 2014, First Named Inventor: Alexandre Depraete.
U S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.
U.S. Appl. No. 14/522,263, filed Oct. 23, 2014, First Named Inventor: Alexandre Depraete.
U.S. Appl. No. 14/522,302, filed Oct. 23, 2014, First Named Inventor: Alexandre Depraete.
U.S. Appl. No. 14/522,333, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,022, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
U.S. Appl. No. 14/687,602, filed Apr. 15, 2015, First Named Inventor: Alexandre Depraete.
Lindemann et al., "iTC—Innovative Solutions for Torque Converters Pave the Way into the Future", Torque Converter 20, pp. 280-301.
Corresponding ISR of PCT/EP2015/076887 dated Jun. 5, 2016.

* cited by examiner

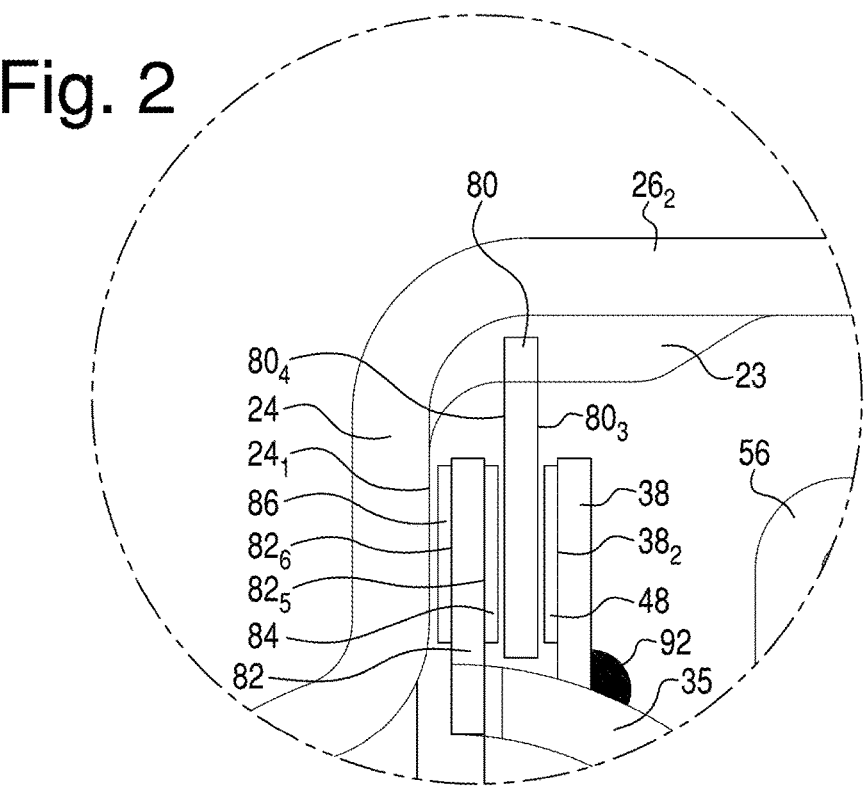
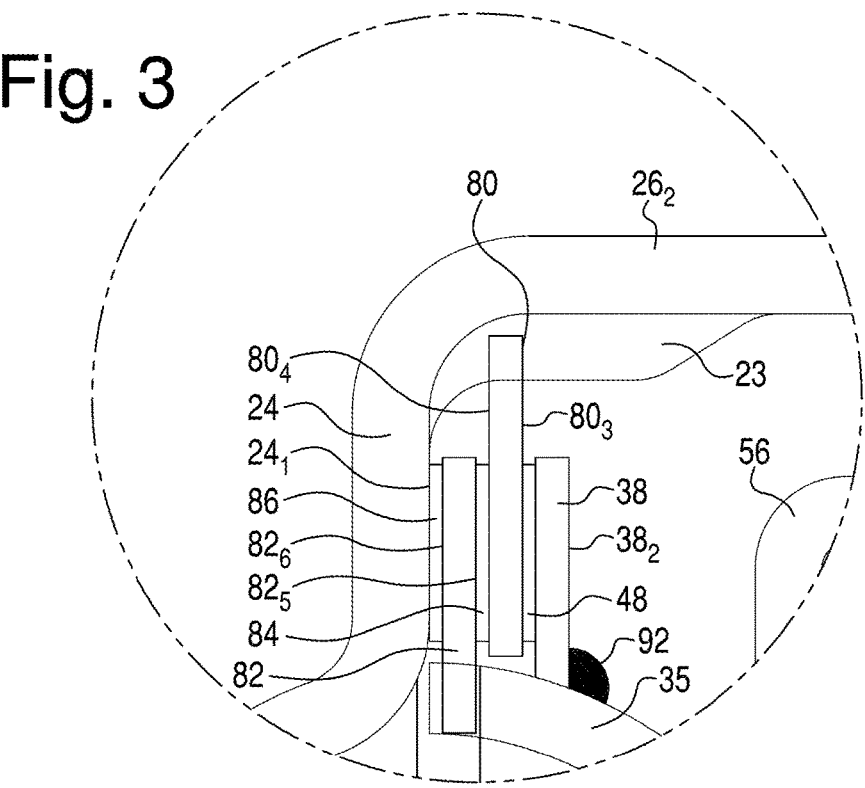

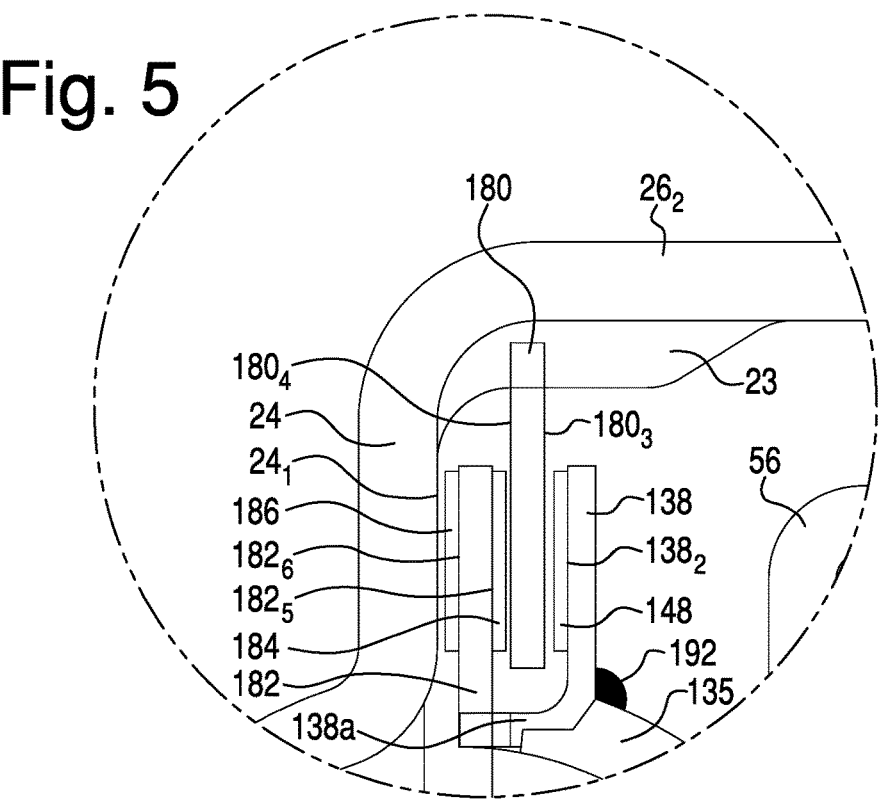
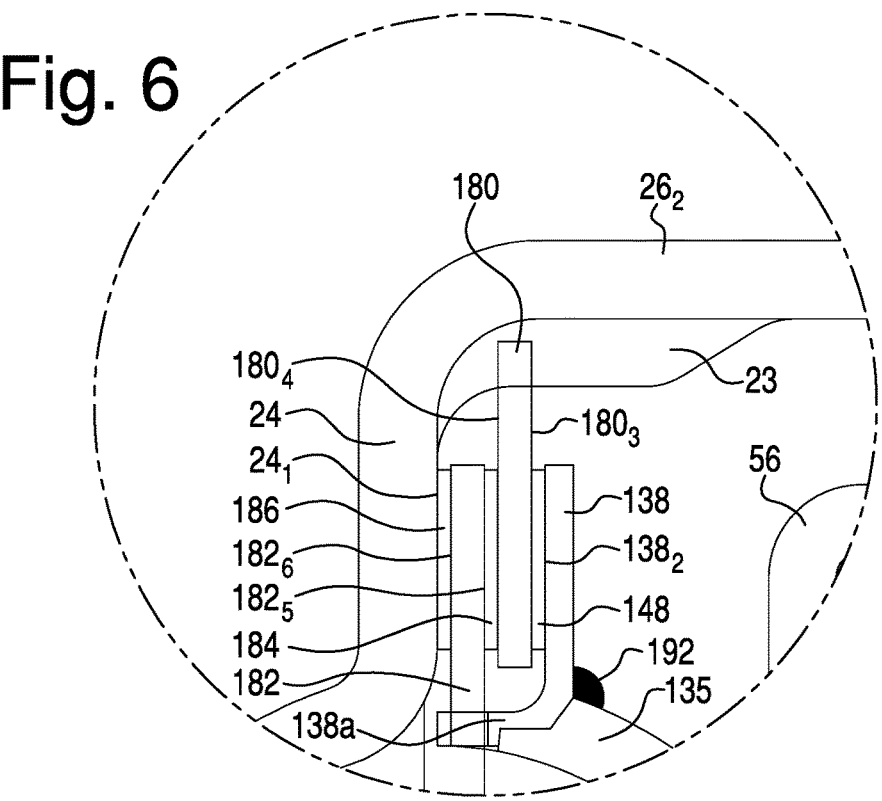

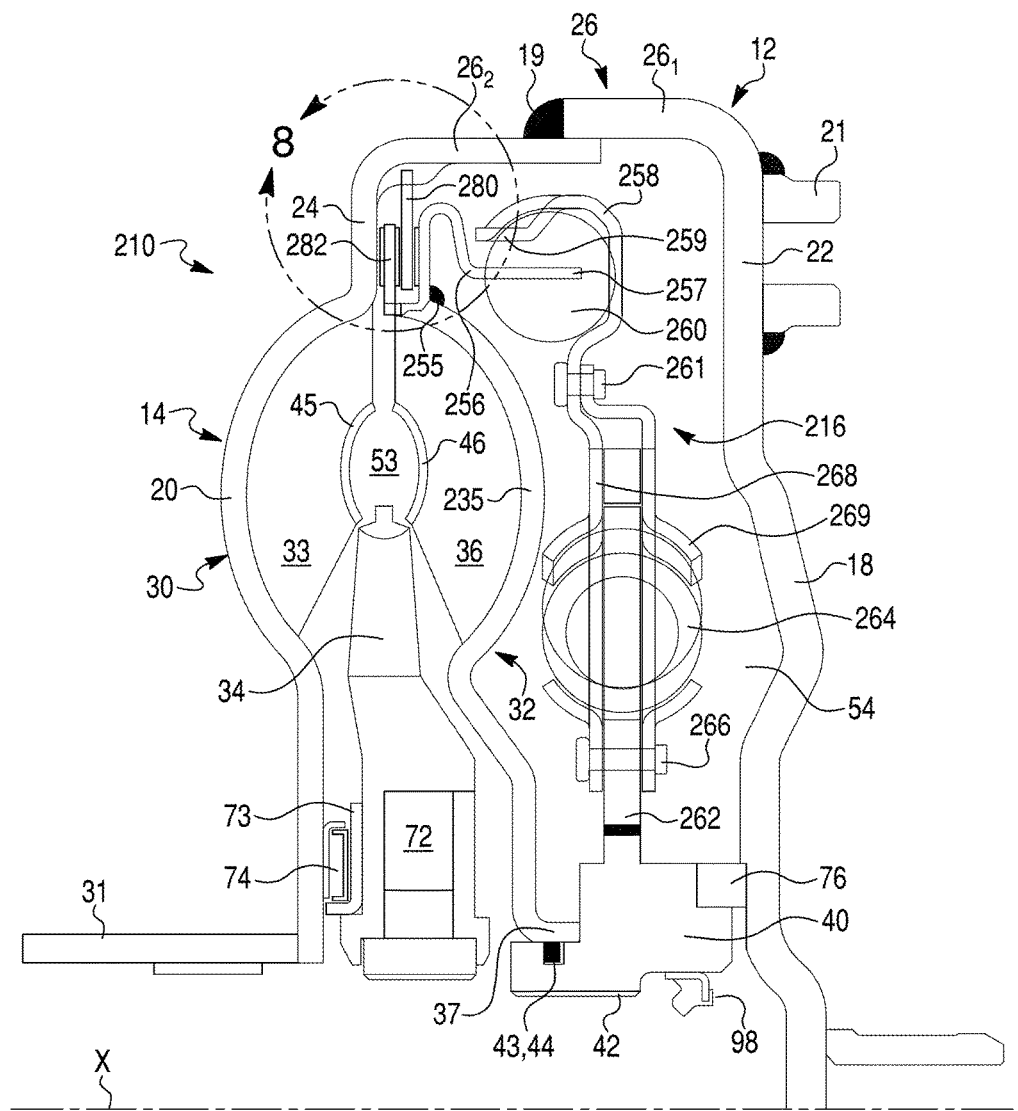

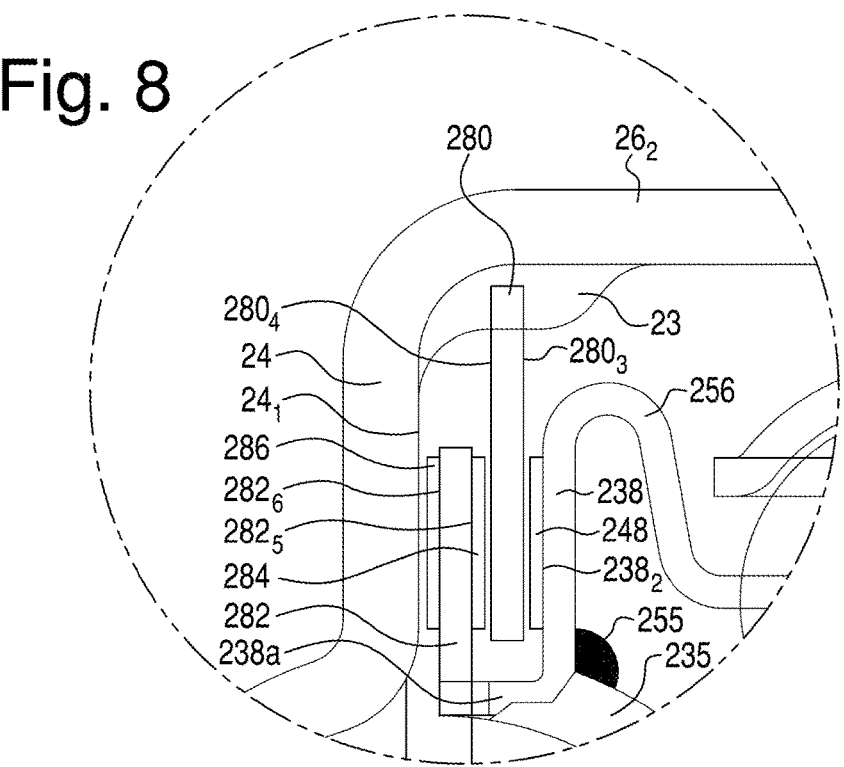
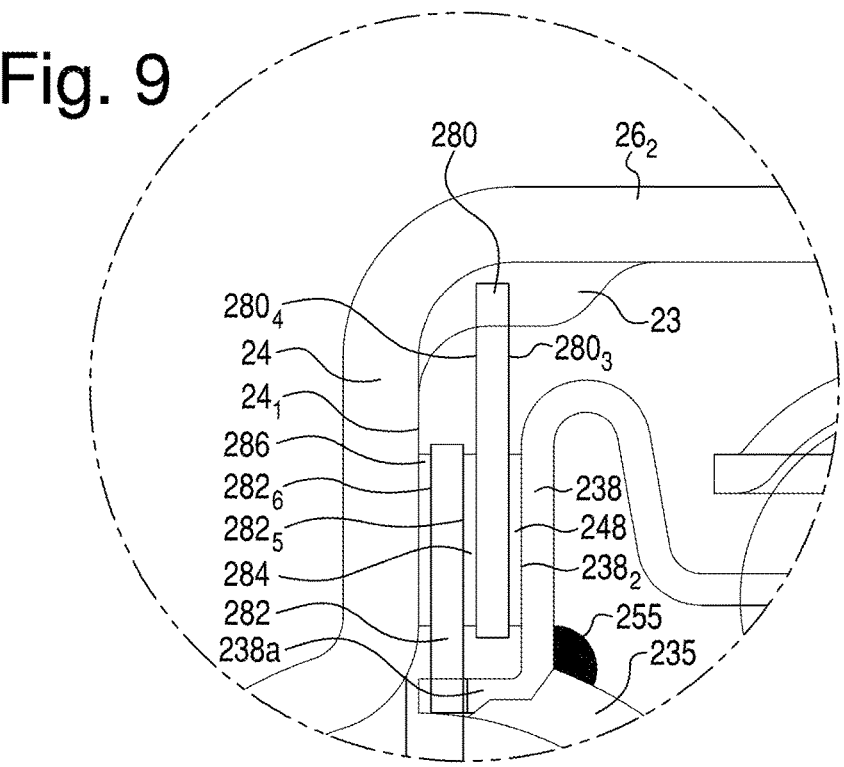

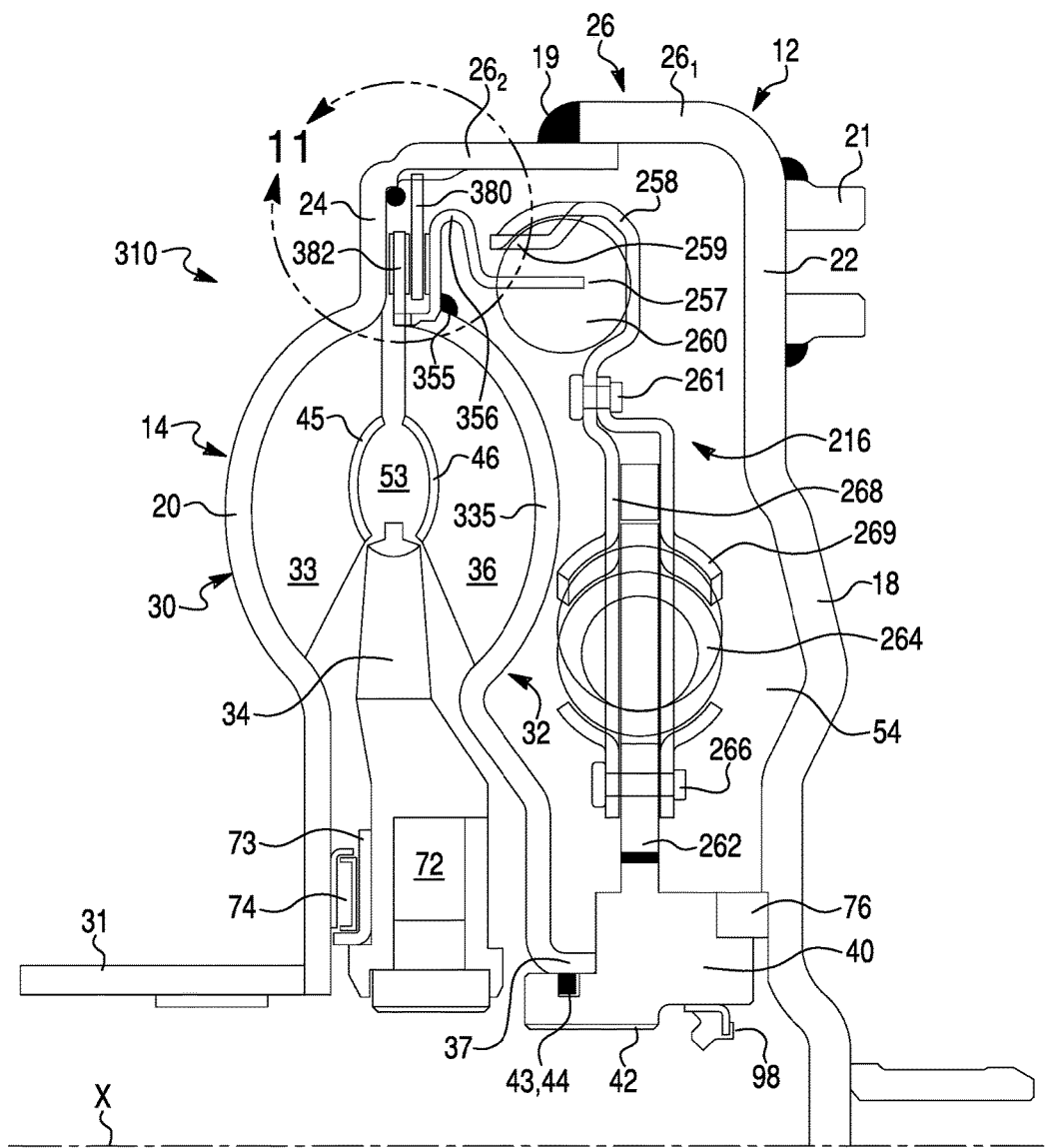

TORQUE CONVERTER AND HYDROKINETIC TORQUE COUPLING DEVICE HAVING TURBINE-PISTON LOCKUP CLUTCH, AND RELATED METHODS

BACKGROUND OF THE INVENTION

1. Field of the Invention

The present invention generally relates to torque converters and hydrokinetic torque coupling devices, and more particularly to torque converters and hydrokinetic torque coupling devices including a turbine-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, a torque converter is provided that includes an impeller rotatable about a rotational axis, an axially displaceable turbine-piston coaxially aligned with and hydrodynamically drivable by the impeller to rotate about the rotational axis, and a clutch plate having opposite clutch plate surfaces interposed between and axially movable. The impeller has a first surface and includes an impeller shell. The turbine-piston includes a turbine-piston shell and a turbine-piston flange fixedly connected to the turbine-piston shell so as to be non-rotatable relative to the turbine-piston shell. The turbine-piston is axially displaceable relative to the impeller to move a second surface of the turbine-piston flange towards and away from the first surface for positioning the torque converter into and out of a lockup mode in which the first and second surfaces and the clutch plate surfaces frictionally interlock with one another so that the impeller is mechanically locked to and non-rotatable relative to the turbine-piston.

A second aspect of the invention provides a hydrokinetic torque coupling device that includes an impeller rotatable about a rotational axis, a casing, an axially displaceable turbine-piston coaxially aligned with and hydrodynamically drivable by the impeller to rotate about the rotational axis, and a clutch plate having opposite clutch plate surfaces interposed between and axially movable relative to at least one of the first and second surfaces. The impeller has a first surface and includes an impeller shell. The casing includes the impeller shell and a casing shell connected to the impeller shell. The turbine-piston includes a turbine-piston shell and a turbine-piston flange fixedly connected to the turbine-piston shell so as to be non-rotatable relative to the turbine-piston shell. The turbine-piston is axially displaceable relative to the impeller to move a second surface of the turbine-piston flange towards and away from the first surface for positioning the hydrokinetic torque coupling device into and out of a lockup mode in which the first and second surfaces and the clutch plate surfaces frictionally interlock with one another so that the casing is mechanically locked to and non-rotatable relative to the turbine-piston.

A third aspect of the invention provides a method of assembling a hydrokinetic torque coupling device for coupling a driving shaft and a driven shaft together. A torque converter is provided that includes an impeller having an impeller shell, and an axially displaceable turbine-piston having a turbine-piston shell and a turbine-piston flange. The torque converter is operatively connected to a casing shell and a clutch plate having opposite clutch plate surfaces to assemble the hydrokinetic torque coupling device, with the clutch plate is interposed between and axially movable relative to at least one of a first surface of the casing and a second surface of the turbine-piston shell. The turbine-piston is axially displaceable relative to the casing to move the second surface axially towards and away from the first surface for positioning the hydrokinetic torque coupling device into and out of a lockup mode in which the first and second surfaces and the clutch plate surfaces frictionally interlock with one another so that the casing is mechanically locked to and non-rotatable relative to the turbine-piston.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 2 is an enlarged fragmentary view of circle 2 of FIG. 1 showing the hydrokinetic torque coupling device of the first exemplary embodiment out of lockup mode; and FIG. 3 is an enlarged fragmentary view of circle 2 of FIG. 1, but with the hydrokinetic torque coupling device of the first exemplary embodiment shown in the lockup mode;

FIG. 5 is an enlarged fragmentary view of circle 5 of FIG. 4 showing the hydrokinetic torque coupling device of the second exemplary embodiment out of lockup mode; and FIG. 6 is an enlarged fragmentary view of circle 5 of FIG. 4, but with the hydrokinetic torque coupling device of the second exemplary embodiment shown in the lockup mode;

FIG. 7 is a fragmented half-view in axial cross section of a hydrokinetic torque coupling device equipped with a turbine-piston in accordance with a third exemplary embodiment of the present invention;

FIG. 8 is an enlarged fragmentary view of circle 8 of FIG. 7 showing the hydrokinetic torque coupling device of the third exemplary embodiment out of lockup mode; and FIG. 9 is an enlarged fragmentary view of circle 8 of FIG. 7, but with the hydrokinetic torque coupling device of the third exemplary embodiment shown in the lockup mode;

FIG. 10 is a fragmented half-view in axial cross section of a hydrokinetic torque coupling device equipped with a turbine-piston in accordance with a fourth exemplary embodiment of the present invention;

Figure 1:
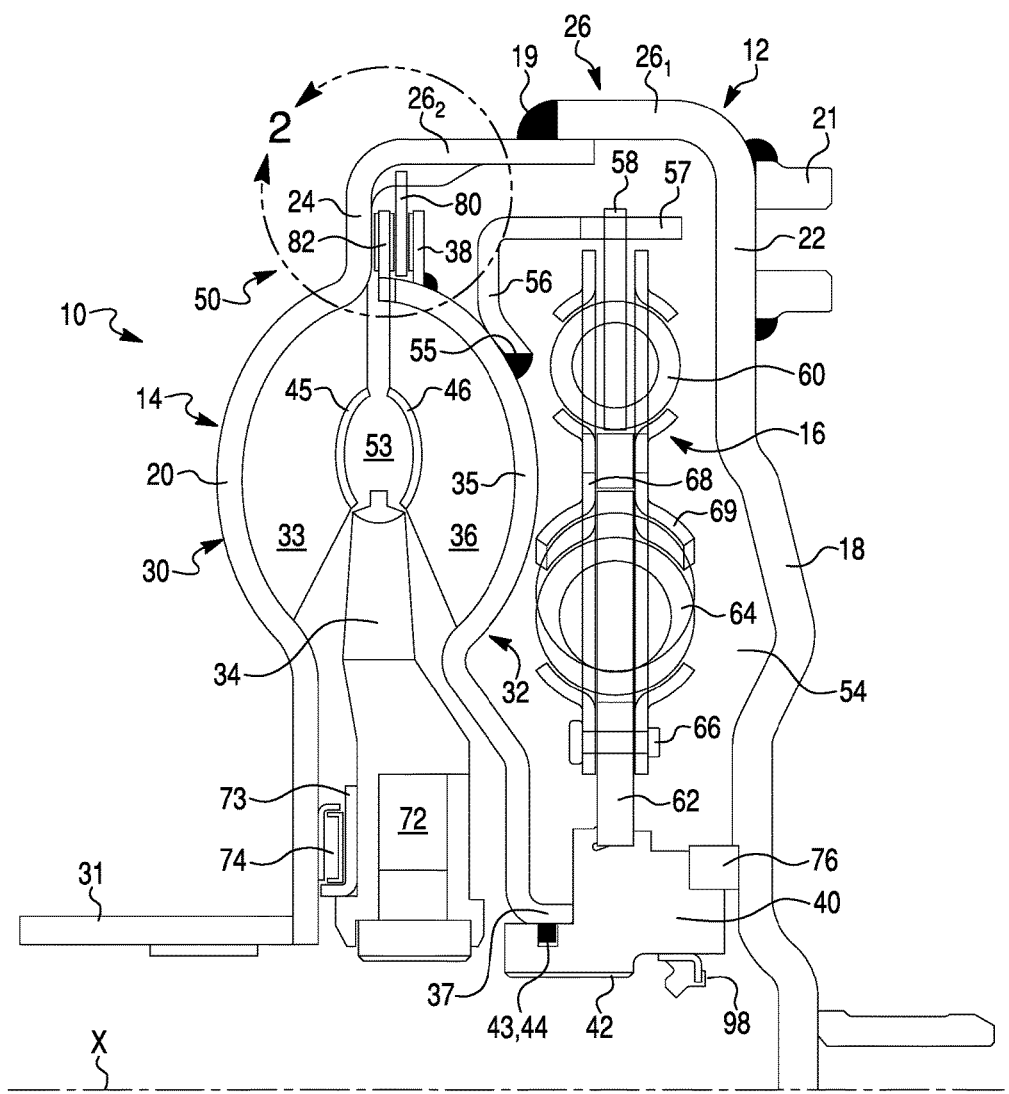
FIG. 1 is a fragmented half-view in axial cross section of a hydrokinetic torque coupling device equipped with a turbine-piston in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

An exemplary embodiment of a hydrokinetic torque coupling device is generally represented in the accompanying drawings by reference numeral 10, as best shown in the fragmentary sectional view in FIG. 1. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. The drawings discussed herein show half-views, that is, the cross section of a portion or fragment of the hydrokinetic torque coupling devices above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 18 and a second casing shell 20 fixedly and sealingly connected together, such as by weld 19 at their outer peripheries, and non-movable relative to one another yet rotatable about the axis X. The first shell 18 is interconnected to and non-movable relative to the driving shaft, more typically a flywheel (not shown) that is fixed to and non-rotatable relative to the driving shaft, so that the casing 12 turns at the same speed that the engine operates. Specifically, in the illustrated embodiment of FIG. 1 the casing 12 is rotationally driven by the internal combustion engine and is coupled and non-rotatable relative to the flywheel thereof with studs 21, shown in FIG. 1. Each of the first and second casing shells 18, 20 may be made, for example, integrally by press-forming one-piece metal sheets.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. Similarly, the second casing shell 20 includes a second sidewall portion 24 extending substantially radially relative to the direction from the rotational axis X and a cylindrical second outer wall portion $26_2$ extending substantially axially from the second sidewall portion 24 toward the first casing shell 18. The second sidewall portion 24 includes a first surface $24_1$, best shown in FIGS. 2 and 3. The first and second outer wall portions $26_1$, $26_2$ collectively establish an annular outer wall 26 substantially parallel with the rotation axis X. The weld 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$ together.

The torque converter 14 includes an impeller (sometimes referred to as the pump or impeller wheel) 30, a turbine-piston 32, and a stator (sometimes referred to as the reactor) 34 interposed axially between and operatively connecting the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes an impeller core ring 45, and a plurality of impeller blades 33 fixedly attached, such as by brazing, to impeller core ring 45 and the impeller shell 20. The impeller 30, including its shell 20, the impeller core ring 45, and the impeller blades 33, is secured to the first casing shell 18 so as to be non-rotatable relative to the casing 12 and hence interconnected to the drive shaft (or flywheel) of the engine to rotate at the same speed as the engine output. The impeller 30 also includes an impeller hub 31 fixedly secured to the impeller shell 20. The impeller hub 31 is arranged for engagement with a hydraulic pump of the transmission.

The turbine-piston 32 is a consolidation or incorporation of a turbine with a lockup clutch piston. The turbine component of the turbine-piston 32 includes a turbine-piston shell 35, a turbine-piston core ring 46, and a plurality of turbine-piston blades 36 fixedly attached, such as by brazing, to the turbine-piston core ring 46 and the turbine-piston shell 35. The spinning of the impeller 30 causes transmission fluid in the torus to spin the turbine blades 36, and hence the turbine-piston core ring 46 and the turbine-piston shell 35. The impeller shell 20 and the turbine-piston shell 35 collectively define a substantially toroidal inner chamber (or torus chamber) 53 therebetween. As discussed in further detail below, a drive component 56 is affixed to the turbine-piston shell 35, such as by an annular weld 55 and/or fasteners.

The piston component of the turbine-piston 32 includes a substantially annular, planar (i.e., flat) turbine-piston flange (or turbine-piston wall) 38. The turbine-piston flange 38 is distal to the rotational axis X relative to a proximal flange 37 discussed below. The turbine-piston flange 38 is a radial attachment to the turbine-piston shell 35 and, as illustrated in FIG. 1, is disposed radially outside of the turbine blades 36. The turbine-piston flange 38 and the turbine-piston shell 35 are embodied as separate components connected together by weld 92. Alternatively, the turbine-piston flange 38 and the turbine-piston shell 35 may be integral with one another, e.g., made of a single or unitary component. The turbine-piston flange 38 extends from a radially outer peripheral end of the turbine-piston shell 35 radially outward, transverse to rotational axis X, to terminate at an end in spaced relationship to an inner peripheral surface of the annular outer wall portion $26_2$ of the casing 12. The turbine-piston flange 38 includes a second surface $38_2$ facing the first surface $24_1$ of the impeller shell 20.

As best shown in FIGS. 2 and 3, a first clutch plate 80 and a second clutch plate 82 are interposed between the first and second surfaces $24_1$ and $38_2$. The first clutch plate 80 is non-fixedly connected to the impeller shell 20 so as to be axially displaceable yet non-rotatable relative to the impeller shell 20. Splines 23 are formed in the inner surface of outer wall portion $26_2$ or ring gear is mounted on and non-rotatably relative to the impeller shell 20, more specifically the outer wall 26 of the casing 12. The splines/ring gear 23 non-fixedly connects the first clutch plate 80 to the impeller shell 20 to allow axial movement of the first clutch plate 80 relative to the impeller shell 20, but to render the first clutch plate 80 non-rotatable relative to the impeller shell 20 so that the first clutch plate 80 and the impeller shell 20 rotate at the same speed. The radially outer edge of the first clutch plate 80 may have splines or teeth to intermesh with the splines/ring gear 23. The first clutch plate 80 includes a third surface $80_3$ facing and parallel to the second surface $38_2$, and an opposite fourth surface $80_4$. In the illustrated embodiment, neither the third surface $80_3$ nor the fourth surface $80_4$ includes a frictional liner or ring.

The second clutch plate 82 is non-fixedly connected to the distal end of the turbine-piston shell 35 so as to be axially displaceable yet non-rotatable relative to the turbine-piston 32. A splined connection may be used to permit axial movement of the second clutch plate 82 relative to the turbine-piston shell 35, while maintaining the parts non-rotatable relative to one another. The second clutch plate 82 includes a fifth surface $82_5$ facing and parallel to the fourth surface $80_4$, and an opposite sixth surface $82_6$ facing and parallel to the first surface $24_1$ of the impeller shell 20. The fifth and sixth surfaces $82_5$ and $82_6$ include friction liner or ring 84 and 86, respectively.

The turbine-piston flange 38 and the clutch plates 80, 82 collectively provide a multi-interface lockup clutch 50. From left to right in the figures, the lockup clutch 50 includes engagement surface pairs $24_1$ and $82_6$, $82_5$ and $80_4$, and $80_3$ and $38_2$ that collectively establish the multi-interface lockup clutch 50. The engagement surfaces of each pair are movable towards and away from one another, e.g., $24_1$ and $82_6$ are movable towards each other into lockup mode and away from each other out of lockup mode, etc. One or more of the surfaces $24_1$, $38_2$, $80_3$, $80_4$, $82_5$, and $82_6$ may be provided with a frictional ring (or friction lining) 48, 84, and 86. The friction rings 48, 84, and 86 may be secured to the engagement surfaces, for example, by adhesive bonding and/or with fasteners. The friction rings 48, 84, and 86 are made of a friction material for improved frictional performance. Friction rings 48, 84, and 86 may be secured to any, all, or none of the surfaces $24_1$, $38_2$, $80_3$, $80_4$, $82_5$, and $82_6$.

Returning to FIG. 1, the stator 34 is positioned between the impeller 30 and the turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is interposed between a side wall plate 73 of the stator 34 and the impeller shell 20 of the casing 12.

The hydrokinetic torque coupling device 10 further includes an output hub 40 that is rotatable about the rotational axis X. The output hub 40 is operatively coupled to and coaxial with the driven shaft. For example., the output hub 40 may be provided with internal splines 42 for coupling the output hub 40 non-rotatably relative to the driven shaft, such as a transmission input shaft, provided with complementary external splines or grooves. Alternatively, a weld or other connection may be used to fix the output hub 40 to the driven shaft, A radially outer surface of the output hub 40 includes an annular slot 43 for receiving, a sealing member, such as an O-ring 44. A sealing member 98, mounted to a radially inner peripheral surface of the output hub 40, creates a seal at the interface of a transmission input shaft (not shown) and the output hub 40.

Extending axially at a radially inner peripheral end of the turbine-piston shell 35 is a substantially cylindrical flange 37 that is proximate to the rotational axis relative to the opposite end of the turbine-piston shell 35. The substantially cylindrical flange 37 of the turbine-piston 32 is rotatable relative to the output hub 40. The sealing member (e.g., O-ring) 44 received in the slot 43 creates a seal at the interface of the substantially cylindrical flange 37 and the output hub 40. As discussed in further detail below, the turbine-piston 32 is axially movably relative to the output hub 40 along this interface.

The damper assembly 16 is housed in the casing 12 axially between the turbine-piston 32 and the first casing shell 18, as shown in FIG. 1. The torsional vibration damper 16 is connected to a plurality of circumferentially spaced driving tabs 57 of the drive member 56. The torsional vibration damper 16 includes an input member 58 having slots or recesses for slidingly receiving the driving tabs 57, a plurality of first (or radially outer) circumferential elastic damping members 60, intermediate disk parts 68, 69 connected by rivet 66 and drivenly coupled to the input member 58 through the first circumferential damping members 60, a plurality of second (or radially inner) circumferential elastic damping members 64, and a driven (or output) member 62 drivenly coupled to the disk parts 68, 69 through the second circumferential damping members 64. The first circumferential damping members 60 are radially outward from the second circumferential damping members 64. According to the exemplary embodiment of FIG. 1 and other embodiments discussed herein, the first and second damping members 60, 64 are configured as helical (or coil) springs having principal axes oriented substantially circumferentially. Other elastic members may be selected to replace or supplement the springs.

The intermediate disk parts 68, 69 of the damper assembly 16 are rotatable relative to the input member 58 due to elasticity of the first damping members 60, which absorb torsional vibration. The input member 58 engages first ends of the first damping members 60, and the disk parts 68, 69 engage second ends of the first damping members 60. Likewise, the driven member 62 is rotatable relative to the disk parts 68, 69 due to the elasticity of the second damping members 64. The intermediate disk parts 68, 69 engage first ends of the damping members 64, and the driven member 62 engages second ends of the second damping members 64. The disk parts 68, 69 are thus rotatable relative to the driven member 62, with the damping members 64 absorbing torsional vibration due to their elasticity. The damping members 64 are configured as helical (or coil) springs having a principal axis oriented substantially circumferentially. Other elastic members may be selected to replace or supplement the springs.

The driven member 62 is fixedly connected so as to be non-rotatable relative to the output hub 40. The non-rotatable connection between the driven member 62 and the output hub 40 may be formed by splines or welding. Alternatively, the output hub 40 and driven member 62 may be integrally formed as a single-piece part. A thrust bearing 76 is positioned between the output hub 40 and the first casing shell 18. A radially inner surface of the output hub 40 includes splines 42 for engaging (non-rotatably relative to) the driven shaft of the transmission.

The turbine-piston 32 is axially displaceable to move the second surface $38_2$ of the turbine-piston flange 38 axially towards and away from the first engagement surface $24_1$ for positioning the hydrokinetic torque coupling device 10 respectively into and out of a lockup mode in which the casing 12 is mechanically locked to the input member 58 of the damper assembly 16. The axial displacement of the turbine-piston flange 38 with the turbine-piston 32 causes the second surface $38_2$ to come into contact with the first clutch plate 80, axially sliding the first clutch plate 80 along splines 23 so that the first clutch plate 80 contacts the second clutch plate 82 and axially slides the both clutch plates 80, 82 towards the first surface $24_1$. The continued axial movement of the turbine-piston flange 38 towards the first surface $24_1$ causes the hydrokinetic torque coupling device 10 to enter into the lockup mode in which the surfaces $24_1$ and $82_6$ (via the friction lining 86), the surfaces $82_5$ and $80_4$ (via the friction lining 84), and the surface $80_3$ and $38_2$ (via friction ring 48) interface and are frictionally engaged with on other and in which the turbine-piston 32 is mechanically locked to and non-rotatable relative to the impeller 30.

In the lockup mode, torque is transferred from the engine to the casing 12, then by way of the frictionally interlocked surfaces (and the frictional linings thereof) to via the drive component 56 to the damping assembly 16 and the output hub 40. Notably, the connection between the drive tabs 57 of the drive component 56 and recess of the input member 58 of the damping assembly 16 allows the output hub 40 to remain axially fixed relative to the casing 12 as the turbine-piston 32 is axially displaced into and out of the lockup mode. In the lockup mode, the lockup clutch bypasses the hydrodynamic fluid coupling of the torque converter 14 and mechanically non-rotatably couples the driving and driven shafts to one another. The provision of multiple lockup interfaces $24_1/82_6$, $82_5/80_4$, and $80_3/38_2$ increases torque capacity of the device 10.

As the turbine-piston 32 and the drive member 56 move axially into the lockup mode as described above, the driving tabs 57 of the drive member 56 are axially displaced through the recesses of the input member 58. The axial movement of the driving tabs 57 relative to the input member 58 allows the input member 58, the disks 68, 69, the driven member 62, and the damping members 60, 64 to remain fixed axially on the output hub 40 while the turbine-piston 32 and the drive member 56 move in the axial direction. Notably, the friction rings 48, 84, and 86 may have circumferentially spaced grooves (not shown) extending generally radially so as to fluidly connect the torus chamber 53 and the damper chamber 54 with one another in the lockup mode for cooling friction surfaces of the lockup clutch 50 by the working fluid.

In the non-lockup mode, the turbine-piston 32 is displaced axially away from the impeller 30, axially moving the turbine-piston shell 35 and the turbine-piston flange 38 so that the surface pairs $24_1$ and $82_6$, $82_5$ and $80_4$, and $80_3$ and $38_2$ (including their frictional linings 48, 84, 86) are axially spaced from one another and no longer frictionally non-rotatably coupled. Thus, torque transferred from the engine to the casing 12 does not bypass the torque converter 14 through the lockup clutch. In the non-lockup mode, normal operation of the torque converter 14 hydrodynamically couples and decouples the impeller 30 to and from the turbine-piston 32. Notably, in the non-lockup mode an open fluid passage is established between the first surface $24_1$ of the casing 12 and the sixth surface $82_6$ for permitting fluid flow between the torus chamber 53 and the damper chamber 54.

As discussed above, the turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35. Referring to FIG. 1, the torus chamber 53 is to the left side of the turbine-piston shell 35, and the damper chamber 54 is to the other (right) side of the turbine-piston shell 35. A pressure increase in the torus chamber 53 relative to the damper chamber 54 (or stated differently a pressure decrease in the damper chamber 54 relative to the torus chamber 53) shifts the turbine-piston 32 axially against the direction of torque transmission, i.e., towards the input side of the casing 12, that is left to right in FIG. 1, out of lockup mode. On the other hand, a pressure decrease in the torus chamber 53 relative to the damper chamber 54 (or stated differently a pressure increase in the damper chamber 54 relative to the torus chamber 53) shifts the turbine-piston 32 axially towards the direction of torque transmission, i.e., towards the output side of the casing, that is right to left in FIG. 1, into the lockup mode. Pressure changes are created by control of the fluid, e.g., hydraulic fluid or oil, in the chambers 53 and 54.

In operation, the lockup clutch 50 is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown, a biasing member, such as a spring, may be included in the hydrokinetic torque coupling device 10 to axially urge the turbine-piston 32 into or out of lockup mode.

The turbine-piston 32 both forms the shell component of the turbine and the piston component of the lockup clutch 50, as described above. By consolidating two components that are normally separate from one another into a single component, space is saved in the hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components. Additionally, and as discussed in greater detail below, the drive component 56 simplifies assembly of the hydrokinetic torque coupling device 10.

Various modifications, changes, and alterations may be practiced with the above-described embodiment. In the interest of brevity, reference characters that are discussed above in connection with FIGS. 1-3 are not further elaborated upon below, except to the extent necessary or useful to explain the additional embodiments. The features of the embodiments described herein may be practiced with one another and are substitutable in various combinations. For example, FIGS. 4-12 illustrated additional exemplary embodiments. In the interest of brevity, the following description generally focuses on differences between the first exemplary embodiment and the following additional exemplary embodiments.

Figure 4:
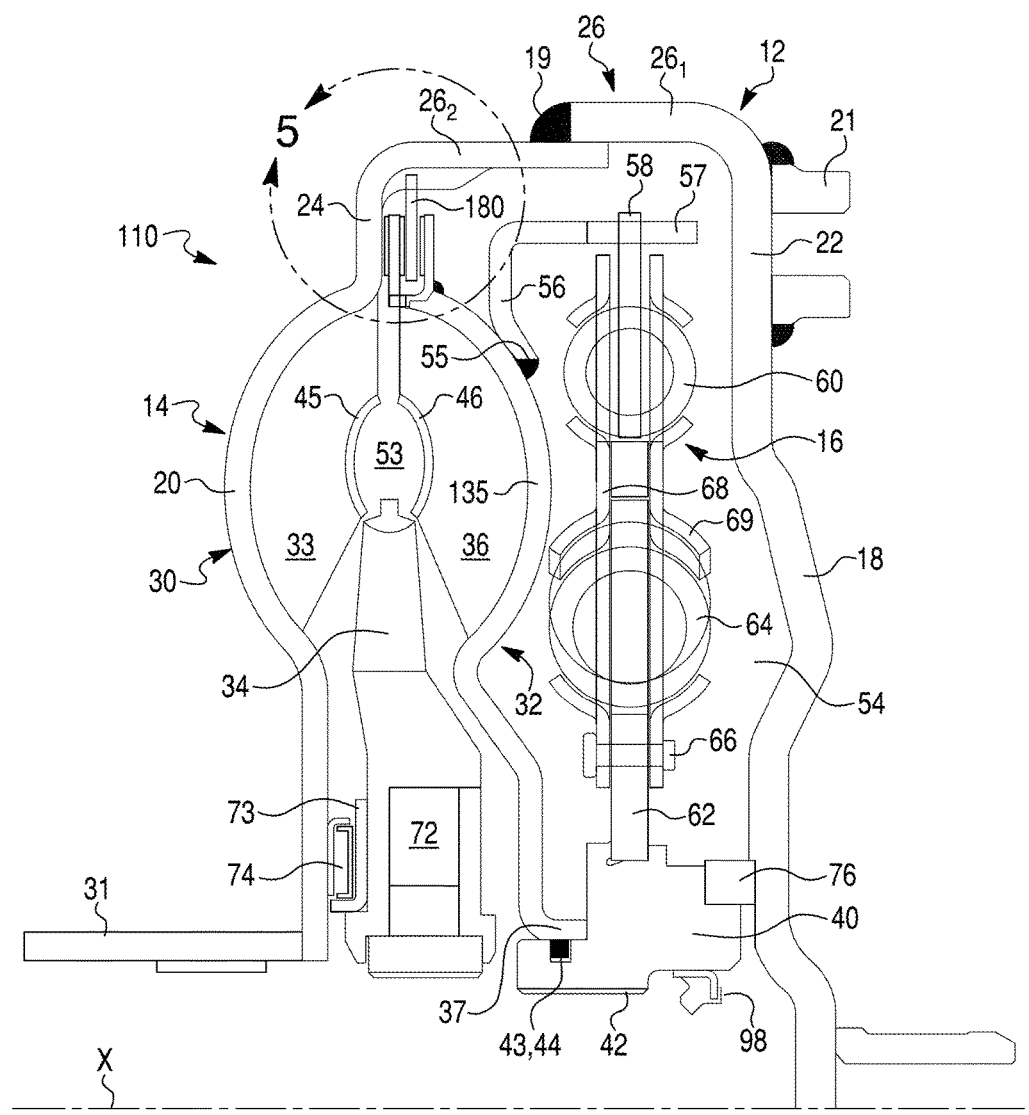
FIG. 4 is a fragmented half-view in axial cross section of a hydrokinetic torque coupling device equipped with a turbine-piston in accordance with a second exemplary embodiment of the present invention.

FIGS. 4-6 illustrate a second embodiment of a hydrokinetic torque coupling device 110 featuring a lockup clutch that includes a turbine-piston flange 138 having a second surface $138_2$ with a friction liner 148 facing the first surface $24_1$. The turbine-piston flange 138 includes an axially extending portion 138a and is secured by weld 192 to a turbine-piston shell 135. A first clutch plate 180 is axially slidably connected to the outer wall portion $26_2$ via splines/gear 23, and includes a third surface $180_3$ facing and parallel to the friction lining 148 and the second surface $138_2$, and an opposite fourth surface $180_4$. A second clutch plate 182 is axially slidably connected to the axially extending portion 138a of the turbine-piston flange 138 via splining or the like and includes a fifth surface $182_5$ with a friction lining 184 facing and parallel to the fourth surface $180_4$, and an opposite sixth surface $182_6$ with a friction lining 186 facing and parallel to the first surface $24_1$.

FIGS. 7-9 illustrate a third embodiment of a hydrokinetic torque coupling device 210 featuring a lockup clutch that includes a turbine-piston flange 238 having a second surface $238_2$ with a friction liner 248 facing the first surface $24_1$. The turbine-piston flange 238 includes an axially extending portion 238a and is welded by weld 255 to a turbine-piston shell 235. A first clutch plate 280 is axially slidably connected to the outer wall portion $26_2$ via splines/gear 23, and includes a third surface $280_3$ facing and parallel to the friction lining 248 and the second surface $238_2$, and an opposite fourth surface $280_4$. A second clutch plate 282 is axially slidably connected to the axially extending portion 238a of the turbine-piston flange 238 via splining or the like and includes a fifth surface $282_5$ with a friction lining 284 facing and parallel to the fourth surface $280_4$, and an opposite sixth surface $282_6$ with a friction lining 286 facing and parallel to the first surface $24_1$. The turbine-piston flange 238 is integrally formed as a single piece with a drive component 256, for example, by providing the drive component 256 with a goose-neck portion.

Figure 11:
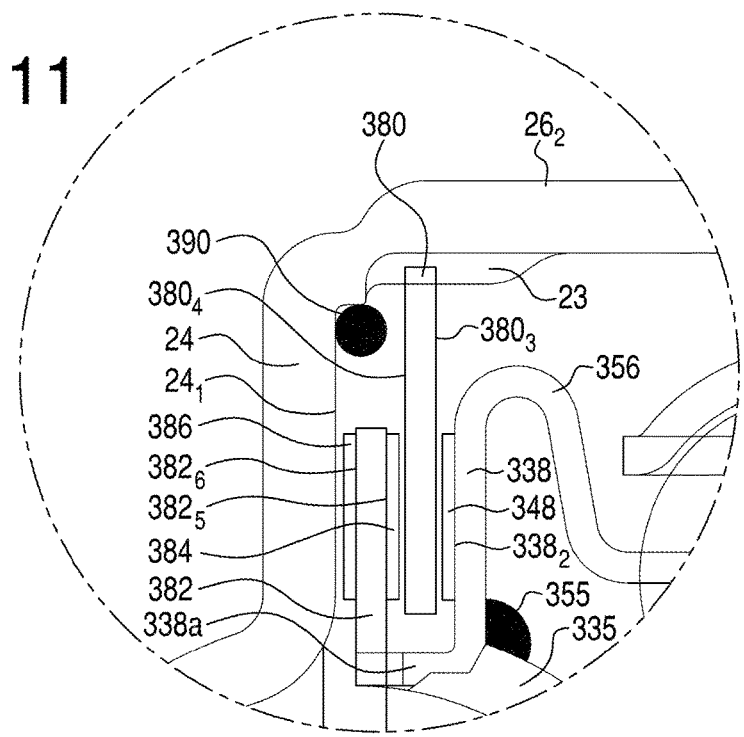
FIG. 11 is an enlarged fragmentary view of circle 11 of FIG. 10 showing the hydrokinetic torque coupling device of the first exemplary embodiment out of lockup mode.
Figure 12:
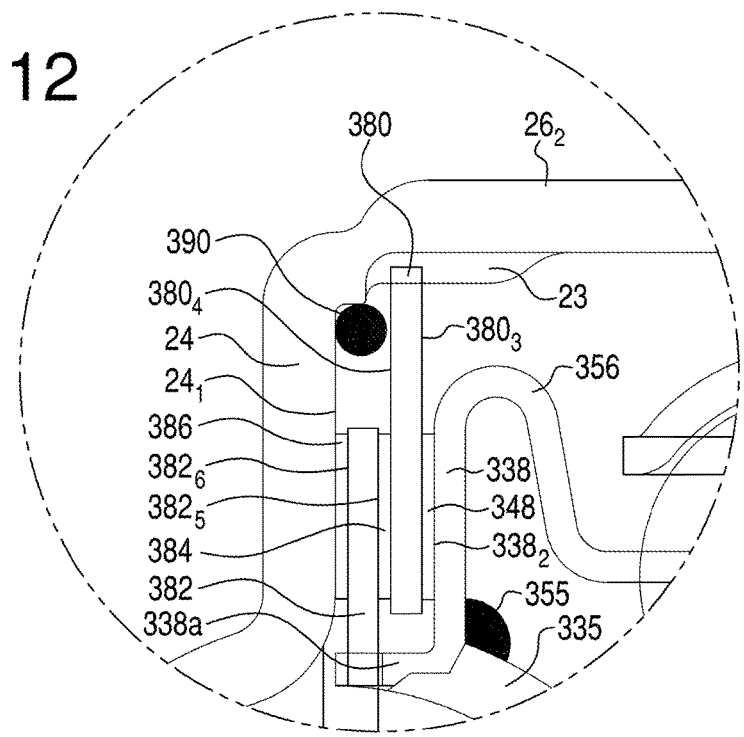
FIG. 12 is an enlarged fragmentary view of circle 11 of FIG. 10, but with the hydrokinetic torque coupling device of the fourth exemplary embodiment shown in the lockup mode.

FIGS. 10-12 illustrate a fourth embodiment of a hydrokinetic torque coupling device 310 featuring a lockup clutch that includes a turbine-piston flange 338 having a second surface $338_2$ with a friction liner 348 facing the first surface $24_1$. The turbine-piston flange 338 includes an axially extending portion 338a and is welded by weld 355 to a turbine-piston shell 335. A first clutch plate 380 is axially slidably connected to the outer wall portion $26_2$ via splines/gear 23, and includes a third surface $380_3$ facing and parallel to the friction lining 348 and the second surface $338_2$, and an opposite fourth surface $380_4$. A second clutch plate 382 is axially slidably connected to the axially extending portion 338a of the turbine-piston flange 338 via splining or the like and includes a fifth surface $382_5$ with a friction lining 384 facing and parallel to the fourth surface $380_4$, and an opposite sixth surface $382_6$ with a friction lining 386 facing and parallel to the first surface $24_1$. The turbine-piston flange 338 is integrally formed as a single piece with a drive component 356. The embodiment includes an O-ring 390 abutting an inner surface of the impeller shell 20. Interaction between the O-ring 390 and the first clutch plate 380 as the clutch moves into lockup mode limits axial displacement of the first clutch plate 380, thus regulating the lockup torque capacity of the lockup clutch based on elastomeric and size parameters of the O-ring 390.

The third and fourth embodiments of FIGS. 7-9 and FIGS. 10-12 include a damper assembly 216 that is modified compared to the damper assembly 16 of the first and second embodiments. The damper assembly 216 is connected to drive tabs 257 of the drive member 256 in FIG. 7 or drive tabs 357 of the drive member 356 in FIG. 10. The damper assembly 216 includes a plurality of first (radially outer) circumferential elastic damping members 260, an intermediate member 258 having driven tabs 259 drivenly coupled to the drive member 256 through the first circumferential damping members 260, a plurality of second (radially inner) circumferential elastic damping members 264, and a driven (or output) member 262 drivenly coupled to the intermediate member 258 through the second circumferential damping members 264. A radially inner portion of the intermediate member 258 includes a first disk part 268 on a first side of the second damping members 264. The first disk part 268 is secured to and non-moveable relative to a second disk part 269 on the opposite side of the second damping members 264, such as by rivets 261, 266 or welding. The first and second disk parts 268, 269 establish an input part to the second damping members 264. The driven member 262 establishes an output part relative to the second damping members 264, and is connected and non-rotatable relative to the output hub 40. The driven member 262 has windows in which the second damping members 264 are set. The disk parts 268, 269 engage first ends of the second damping members 264, and the driven member 262 engages second ends of the second damping members 264. The disk parts 268, 269 of the intermediate member 258 are thus rotatable relative to the driven member 262, with the second damping members 264 absorbing torsional vibration due to their elasticity.

Other variations and modifications include modifying the damper assembly 16/216 to include only damping members 60 or damping members 64, or to include additional or no damping members. The features of the above-described embodiments may be practiced with one another and are substitutable in numerous combinations.

An exemplary method for assembling the hydrokinetic torque coupling device 10 according to the embodiment of FIGS. 1-3 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling devices 10, 110, 210, and 310 may be practiced by sequentially performing the steps as set forth below, it should be understood that the methods may involve performing the steps in different sequences.

The impeller 30, the turbine-piston 32 (without the drive component 56), the stator 34, and the damper 16 may each be preassembled. The turbine-piston 32 includes, as noted above, the turbine-piston shell 35 and the turbine blades 36 attached to the turbine-piston shell 35. The drive component 56 and the clutch plates 80 and 82 may be, for example, stamped from metal.

The turbine-piston flange 38 is welded to the turbine-piston shell 32 by weld 92. The second clutch plate 82 is spline connected to the end of the turbine-piston shell 32, and the first clutch plate 80 is set between the turbine-piston flange 38 and the second clutch plate 82. As the impeller 30, the stator 34, and the turbine-piston 32 subassemblies are assembled together, the first clutch plate 80 (preset between the turbine-piston flange 38 and the second clutch plate 82) is received by splines/gear 23. The drive member 56 is secured, such as by welding at the weld 55, to the turbine-piston shell 35. The cylindrical flange 37 of the turbine-piston 32 is mounted to slidingly engage the output hub 40 with the seal 44 therebetween. The damper assembly 16 is then attached to the output hub 40 so that the drive tabs 57 engage the input member 58. The first casing shell 18 is non-moveably and sealingly secured, such as by welding at 19, to the second casing shell 20, as best shown in FIG. 1.

Figure 13:
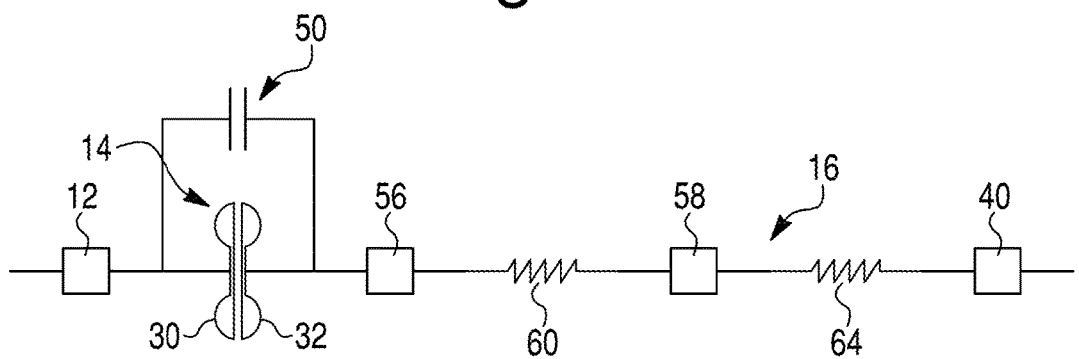
FIG. 13 is a simplified diagram of a hydrodynamic torque coupling device including a turbine-piston with a dual or double damper assembly.

The torque converters and hydrodynamic torque coupling devices described herein may incorporate different damper assemblies. For example, FIG. 13 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60, the intermediate member 58, and the elastic damping members 64 of the damper assembly 16 and the output hub 40 are arranged serially downstream of the turbine-piston shell 35 and the drive member 56 in FIG. 13. The diagram of FIG. 13 generally corresponds to the arrangement of the embodiments shown in FIGS. 1-12.

Figure 14:
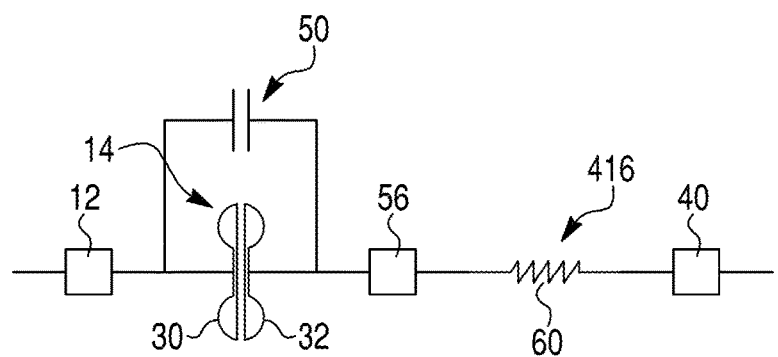
FIG. 14 is a simplified diagram of another hydrodynamic torque coupling device including a turbine-piston with a single damper assembly.

FIG. 14 shows an alternative damper assembly 416 similar to that of FIG. 13, but in which the damper assembly 416 is modified to include only one set of circumferentially extending elastic damping members 60.

Figure 15:
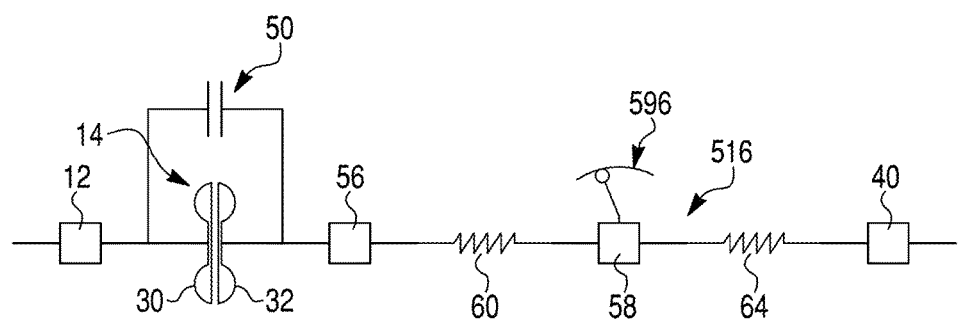
FIG. 15 is a simplified diagram of still another hydrodynamic torque coupling device including a turbine-piston with dual or double damper assemblies and a pendulum vibration absorber.

A damper assembly 516 shown in FIG. 15 is similar to that of FIG. 13, but further includes a centrifugal pendulum oscillator 596 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 596 may be coupled to the circumference of the intermediate member 58 and may be arranged on both sides of the intermediate member 58.

Figure 16:
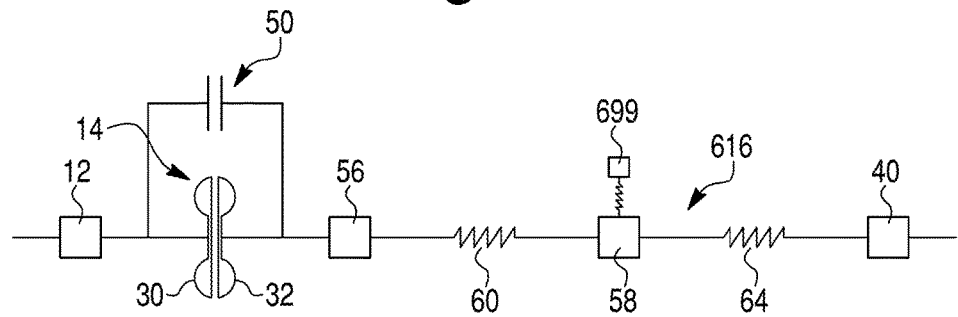
FIG. 16 is a simplified diagram of a further hydrodynamic torque coupling device including a turbine-piston with dual or double damper assemblies and a vibration absorbing spring-mass system.

A damper assembly 616 shown in FIG. 16 is similar to that of FIG. 13, but further includes a spring mass system 699 coupled to the intermediate member 58. Spring-mass systems are well known in the art and described in, for example, WO 2004/018897 to Haller. The spring-mass system 699 may be coupled to the circumference of the intermediate member 58. The spring of the spring-mass system 699 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A torque convener, comprising:
   an impeller rotatable about a rotational axis and comprising an impeller shell having a first surface;
   an axially displaceable turbine-piston coaxially aligned with and hydrodynamically drivable by the impeller to rotate about the rotational axis, the turbine-piston comprising a turbine-piston shell and a turbine-piston flange fixedly connected to the turbine-piston shell so as to be non-movable relative to the turbine-piston shell, the turbine-piston flange having a second surface;
a clutch plate having opposite clutch plate surfaces interposed between and axially movable relative to at least one of the first and second surfaces: and
an O-ring,
wherein the turbine-piston is axially displaceable relative to the impeller to move the second surface towards and away from the first surface and to axially displace the clutch plate for positioning the torque converter into and out of a lockup mode in which the first and second surfaces and the clutch plate surfaces frictionally interlock with one another so that the impeller is mechanically locked to and non-rotatable relative to the turbine-piston, and
wherein the O-ring is positioned and configured to interact with and limit axial displacement of the clutch plate as the turbine-piston and the clutch plate are axially displaced into the lockup mode.

2. The torque converter of claim 1, wherein the clutch plate includes splines connecting the clutch plate to the impeller shell.

3. The torque converter of claim 1, wherein the clutch plate comprises:
a first clutch plate non-fixedly connected to the impeller shell so as to be axially movable yet non-rotatable relative to the impeller shell; and
a second clutch plate non-fixedly connected to the turbine-piston so as to be axially movable yet non-rotatable relative to the turbine-piston.

4. The torque converter of claim 3, wherein the turbine-piston flange and the first and second clutch plates are rotatable relative to one another when the hydrokinetic torque coupling device is out of the lockup mode.

5. The torque convener of claim 3, wherein the turbine-piston comprises turbine-piston blades, and wherein the turbine-piston flange and the first and second clutch plates are situated radially outward of the turbine-piston blades.

6. The torque converter of claim 3, wherein the fast clutch plate has a third surface facing the second surface and an opposite fourth surface, wherein the second clutch plate has a fifth surface facing the fourth surface and an opposite sixth surface facing the first surface.

7. The torque convener of claim 6, wherein the first, second, third, fourth, fifth, and sixth surfaces extend radially and parallel to one another.

8. The torque converter of claim 6, wherein in the lockup mode the first and sixth surfaces frictionally engage one another, the second and third surfaces frictionally engage one another, and the fourth and fifth surfaces frictionally engage one another.

9. The torque converter of claim 8, wherein out of the lockup mode the first and sixth surfaces are spaced from one another, the second and third surfaces are spaced from one another, and the fourth and fifth surfaces are spaced from one another.

10. The torque convener of claim 8, wherein the second surface, the fifth surface, or the sixth surface further comprises at least one friction lining.

11. The torque converter of claim 8, further comprising first, second, and third friction linings respectively secured to the second surface, the fifth surface, and the sixth surface.

12. The torque converter of claim 1, further comprising a stator situated between the impeller and the turbine-piston.

13. A hydrokinetic torque coupling device for coupling a driving shaft and a driven shaft together, comprising:

an impeller rotatable about a rotational axis and comprising an impeller shell;
a casing comprising the impeller shell and a casing shell interconnected to the impeller shell, the casing having a first surface;
an axially displaceable turbine-piston coaxially aligned with and hydrodynamically drivable by the impeller to rotate about the rotational axis, the turbine-piston comprising a turbine-piston shell and a turbine-piston flange fixedly connected to the turbine-piston shell so as to be non-movable relative to the turbine-piston shell, the turbine-piston flange having a second surface;
a clutch plate having opposite clutch plate surfaces interposed between an axially movable relative to at least one of the first and second surfaces; and
an O-ring,
wherein the turbine-piston is axially displaceable relative to the impeller to move the second surface towards and away from the first surface and to axially displace the clutch plate for positioning the hydrokinetic torque coupling device into and out of a lockup mode in which the first and second surfaces and the clutch plate surfaces frictionally interlock with one another so that the casing is mechanically locked to and non-rotatable relative to the turbine-piston, and
wherein the O-ring positioned and configured to interact with and limit axial displacement of the clutch plate as the turbine-piston and the clutch plate are axially displaced into the lockup mode.

14. The hydrokinetic torque coupling device of claim 13, further comprising a damper assembly comprising an input part drivenly interconnected to the turbine-piston and an output part operatively connectable to an output hub.

15. The hydrokinetic torque coupling device of claim 14, wherein the input part of the damper assembly is non-rotatably connected to and axially movable relative to a drive component of the turbine-piston.

16. The hydrokinetic torque coupling device of claim 14, further comprising a stator situated between the impeller and the turbine-piston.

17. The hydrokinetic torque coupling device of claim 14, wherein the damper assembly further comprises an intermediate member, a first set of circumferentially extending elastic damping members drivingly coupling the input part to the intermediate member, the output part connected to and non-rotatable relative to the output hub, a second set of circumferentially extending elastic damping members drivingly coupling the intermediate member to the output part, and a centrifugal pendulum oscillator mounted to the intermediate member.

18. The hydrokinetic torque coupling device of claim 14, wherein the damper assembly further comprises an intermediate member, a first set of circumferentially extending elastic damping members drivingly coupling, the input part to the intermediate member, the output pan connected to and non-rotatable relative to the output hub, a second set. of circumferentially extending elastic damping members drivingly coupling the intermediate member to the output part, and a spring mass system coupled to the intermediate member.

19. The hydrokinetic torque coupling device of claim 13, wherein the turbine-piston is axially displaceable towards an output side of the hydrokinetic torque coupling device in order to frictionally couple the clutch plate surfaces and the first and second surfaces together and position the hydrokinetic torque coupling device in the lockup mode, and wherein the turbine-piston is axially movable towards an input side of the hydrokinetic torque coupling device so that the first and second surfaces are not frictionally coupled with the clutch plate surfaces and the hydrokinetic torque coupling device is not in the lockup mode.

20. A method of assembling a hydrokinetic torque coupling device for coupling a driving shaft and a driven shaft together, comprising:
providing a torque converter comprising an impeller including an impeller shell, an axially displaceable turbine-piston including a turbine-piston shell and a turbine-piston flange; and
operatively connecting the torque converter to a casing shell, an O-ring, and a clutch plate having opposite clutch plate surfaces to assemble the hydrokinetic torque coupling device comprising a casing including the casing shell, wherein the clutch plate is interposed between and axially movable relative to at least one of a first surface of the casing and a second surface of the turbine-piston shell, wherein the turbine-piston is axially displaceable relative to the casing to move the second surface axially towards and away from the first surface and to axially displace the clutch plate for positioning the hydrokinetic torque coupling, device into and out of a lockup mode in which the first and second surfaces and the clutch plate surfaces frictionally interlock with one another so that the casing is mechanically locked to and non-rotatable relative to the turbine-piston, wherein the O-ring is positioned and configured to interact with and limit axial displacement of the clutch plate as the turbine-piston and the clutch plate are axially displaced it to the lockup mode.

21. The torque converter of claim 1, wherein the O-ring is positioned to abut an inner surface of the impeller shell.

22. The hydrokinetic torque coupling device of claim 13, wherein the O-ring is positioned to abut an inner surface of the impeller shell.

23. The method of claim 20, wherein the O-ring is positioned to abut an inner surface of the impeller shell.

* * * * *